INVENTORS.
ROBERT L. PLOUFFE
STANLEY M. SCHREINER
BY Alfred C. Hill
AGENT

INVENTORS.
ROBERT L. PLOUFFE
BY STANLEY M. SCHREINER
Alfred C. Hill
AGENT

Sept. 16, 1969 R. L. PLOUFFE ETAL 3,467,782

TIME DIVISION MULTIPLEX SYSTEM FOR LOW FREQUENCY TRANSMISSION MEDIA

Filed Feb. 11, 1966 3 Sheets-Sheet 3

INVENTORS.
ROBERT L. PLOUFFE
BY STANLEY M. SCHREINER
Alfred C. Hill
AGENT 3,467,782
TIME DIVISION MULTIPLEX SYSTEM FOR LOW FREQUENCY TRANSMISSION MEDIA Robert L. Plouffe, New Canaan, Conn., and Stanley M. Schreiner, Nutley, N.J., assignors to International Telephone and Telegraph Corporation, Nutley, N.J., a corporation of Delaware Filed Feb. 11, 1966, Ser. No. 526,786
Int. Cl. H04j 3/02
U.S. Cl. 179—15 14 Claims

ABSTRACT OF THE DISCLOSURE

The system includes a transmitter having a base frequency signal cooperating to form an information modulated multiplex signal including a framing signal, the base frequency signal being conveyed along with the multiplex signal over the transmission media, and a receiver including means responsive to the conveyed transmitter base frequency signal to provide a base frequency signal for the receiver to operate the distributor of the receiver and means responsive to the transmitted framing signal to cause the receiver distributor to be in synchronism with the transmitter distributor.

This invention relates to pulse communication systems and more particularly to an improved time division multiplex system suitable for operation in conjunction with all transmission media and especially those transmission media capable of transmitting signals in the audio-frequency range, such as telephone, direct current, or carrier transmission circuits and the like.

In prior art communication systems employing time division multiplex techniques, it is the practice to employ a source of base frequency signal which is coupled to two paths. The first path includes a marker or synchronizing signal generator to produce a distinct signal, usually a pulse signal, for synchronization of the receiver with the transmitter. The second path includes a signal distributor to establish a first plurality of time sequential pulse trains, each of these pulse trains being appropriately modulated by the information. The resultant information modulated pulse trains and the synchronizing signal are then coupled to a common circuit to time interleave the synchronizing signal and the information modulated pulse trains to produce a time division multiplex signal. The transmission over audio-frequency range transmission media of the thus produced multiplex signal has in the past been accomplished by pulse modulating a suitable low frequency oscillator with the multiplex signal to thereby convey the information of the multiplex signal by the low frequency signal output of an oscillator provided solely for this purpose. The thusly transmitted multiplex signal has in the past been received at a distant location, converted to a pulse signal with the output from this converter being applied to two separate paths. The first of these paths includes a synchronizing signal detector to establish a base frequency pulse train synchronized to the basic frequency signal of the transmitter which in turn produces through a distributor a second plurality of time sequential pulse trains. The second path includes a plurality of demodulators activated by the appropriate one of the second plurality of pulse trains to separate the appropriate one of the plurality of information modulated pulse trains from the received multiplex signal and demodulate the same.

An object of this invention is to provide a time division multiplex system capable of operating in conjunction with low frequency transmission media resulting in a reduction and simplification of equipment relative to the equipment of the above-mentioned prior art in both the transmitter and receiver.

Another object of this invention is to provide a time division multiplex system including a transmitter having a base frequency signal cooperating to form an information modulated multiplex signal and which is conveyed along with the multiplex signal over the transmission media and a receiver including means responsive to the transmitter base frequency signal to provide the base frequency signal for the receiver.

Still another object of this invention is to provide a time division multiplex system including in the transmitter of this invention a source of information distinctive from the other information occupying one channel of the information modulated multiplex signal which is detected at the receiver of this invention to operate upon the distributor of the receiver to assure that the receiver distributor is in synchronism with (framed to) the transmitter distributor.

A feature of this invention is the provision of a source of base frequency signal having a given repetition frequency which activates a means to provide a first plurality of time sequential pulse trains. Means in the form of logic circuitry responds to the first pulse trains and the information signal of a plurality of sources of information signal to produce an information modulated time division multiplex signal which is coupled to a means which is common to this latter means and the source of base frequency signal to convey the multiplex signal and the base frequency signal to a distant receiver. The conveyed signals are received in a receiver including a means responsive to the received base frequency signal to provide a second plurality of time sequential pulse trains and a means responsive to the second pulse trains and the received multiplex signal to sequentially recover the information signals.

Another feature of this invention is the provision of a means in the transmitter responsive to at least one of the first plurality of pulse trains to provide a signal distinct from the other signals of the information modulated multiplex signal and the receiver includes a means responsive to this distinct pulse to frame or phase adjust the second plurality of pulse trains to be inphase with the first plurality of pulse trains.

Still a further feature of this invention is the provision of a distributor in both the transmitter and receiver activated respectively by the base frequency signal and the received base frequency signal to produce two groups of timing signals, one group having a repetition frequency equal to a first given fraction of the repetition frequency of the base frequency signal and the other group having a repetition frequency equal to a second given fraction, different than the first given fraction, of the repetition frequency of the base frequency signal. The means producing and the means for demodulating the multiplex signal are arranged in a plurality of groups with one pulse train from the first group of pulse trains being coupled to an associated one of the groups of channel modulators and each of the puse trains of the second group being coupled to each of the groups of the channel modulators to provide the channel positions for the time division multiplex signals.

Other features of this invention include the provision of information signals in the form of a three-level code with the framing signal having a fourth level different than the three levels of the information code, an information signal having two level code with the framing signal occupying a third level different than the levels of the information code, the utilization of logic circuitry in the distributor in both the transmitter and receiver to reduce the number of components in the multiplex system and the use of logic circuitry in the form of diode "AND" gates of the three diode and two diode form to provide the channel modulators, the framing signal at the transmitter, and the channel demodulators at the receiver to reduce the components in the multiplex system.

The above-mentioned and other features and objects of this invention will become more apparent by reference to the following description taken in conjunction with the accompanying drawings, in which.

Figure 1:
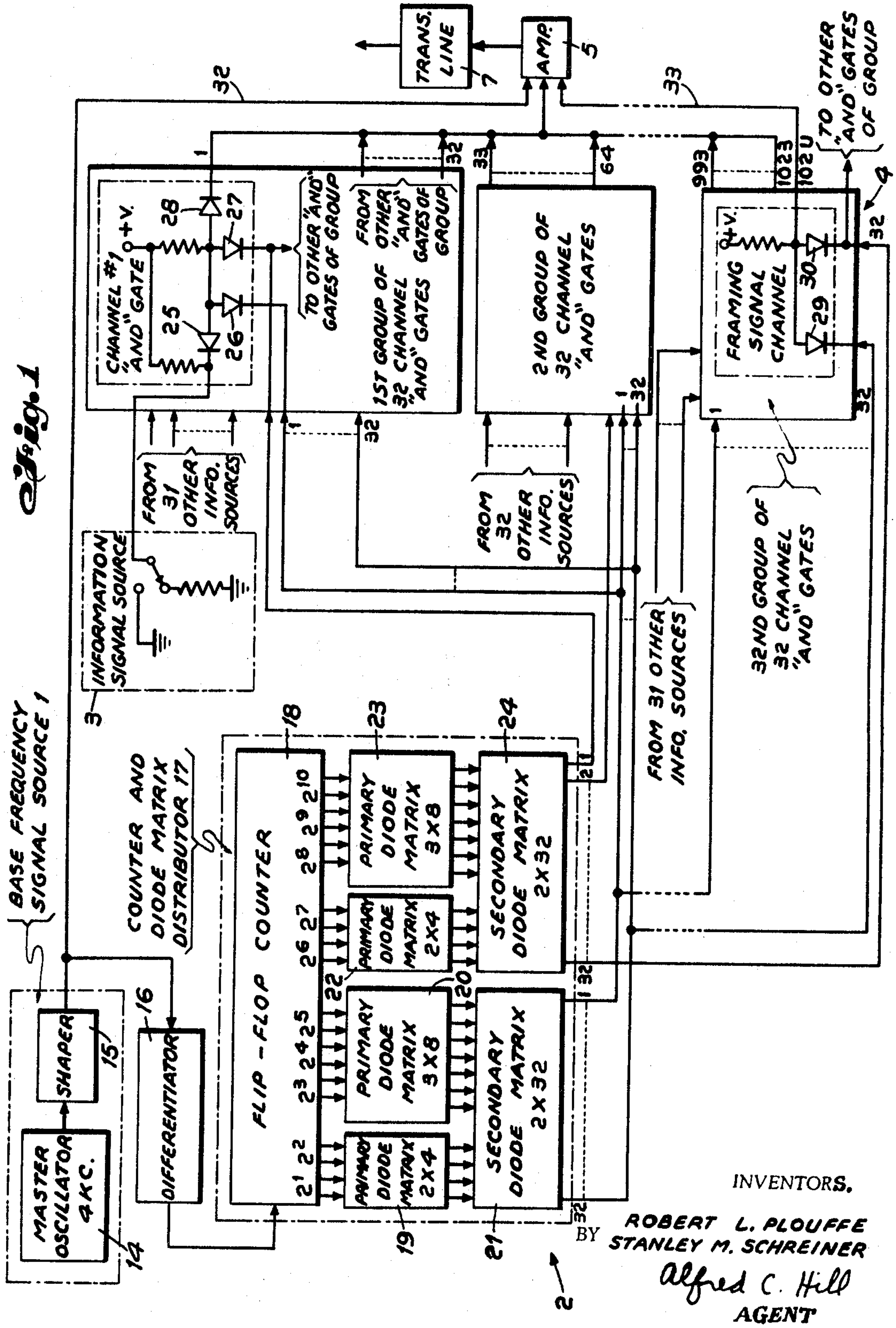
FIGS. 1 and 1A are schematic diagrams in block form of a time division multiplex system in accordance with the principles of this invention.
Figure 1A:
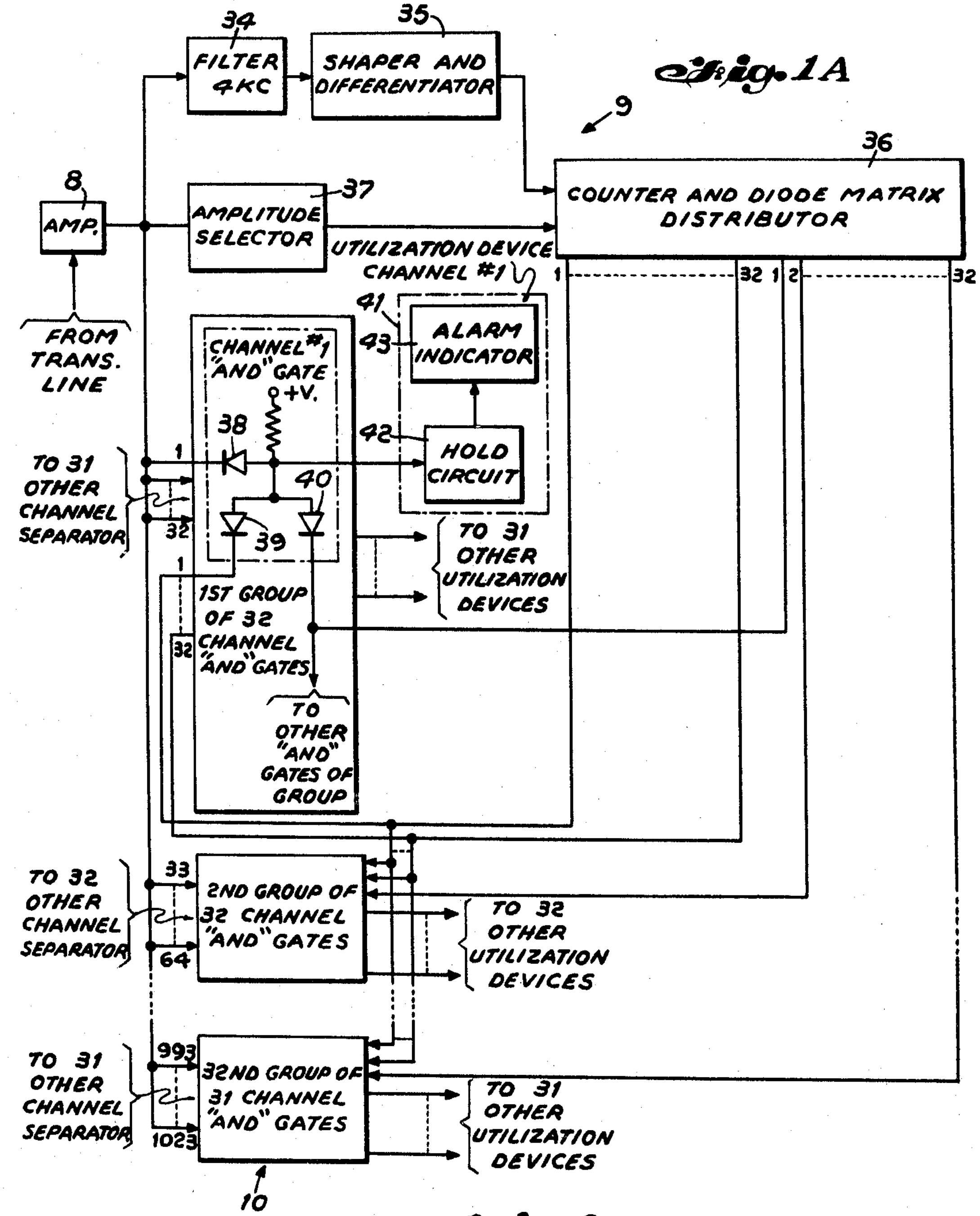

Referring to FIGS. 1 and 1A, the time division multiplex system of this invention is illustrated as including at the transmitter source of base frequency signal 1 having a given repetition frequency coupled to means 2 to produce a plurality of time sequential pulse trains. A plurality of sources of information signals 3 have their outputs coupled to means 4 responsive to the pulse trains of means 2 and the information signals of sources 3 to produce at the output thereof an information modulated time division multiplex signal. A common means in the form of amplifier 5 is coupled to means 4 and the source 1 to convey the information modulated multiplex signal and the base frequency signal to a transmission medium, such as transmission line 7, for propagation to a distant receiver. There is provided in the receiver a means, such as amplifier 8, to receive the conveyed multiplex signal and base frequency signal. Means 9 responds to the base frequency signal to provide a second plurality of time sequential pulse trains and means 10 responds to the second plurality of pulse trains and the received multiplex signal to sequentially recover the information signals.

Figure 2:
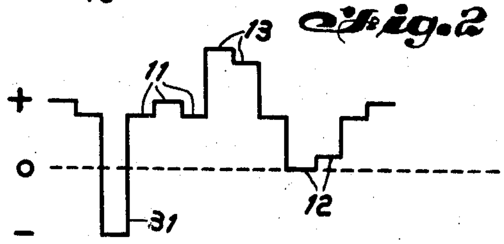
FIG. 2 is a curve illustrating one form of the multiplex signal produced and operated upon in the system of FIGS. 1 and 1A.

To facilitate the understanding of the operation of the multiplex system an example of the base frequency and other specifications relating to the transmitted signal will be employed for purposes of explanation. Further, a specific utility for the multiplex system of this invention will be considered, namely, the utility of this multiplex system to permit the sampling of a plurality of locations to determine whether a burglary has taken place with the information obtained from each of the locations being multiplexed in accordance with the technique herein disclosed for transmission from a satellite office to a central office. The utilization of this system in this type of protection system will permit the reduction in the length of leased lines which previously had been employed from each protected location to the central office resulting in an economic saving in the average length of leased lines since with the arrangement of this invention leased lines are needed only from each of the protected locations to the satellite office. The information will be digital in nature. One form of digital information signal could be binary in nature where the normal state of the protected location is represented by "1" in the binary notation. This information could be obtained by having a given valued resistance connected from the line to ground. When the signal is in this state, the alarm device will be ready to provide alarm information if a burglary should occur. A "0" in the binary notation would indicate a burglary. This could be provided by a short circuit to ground on the line. This other state would last indefinitely until the alarm was reset. Another type of digital signal which could be transmitted as the information signal would be similar to the preceding signal but with a third signal level, or code level, to indicate an open circuit on the line in the protected location. The open circuit indication would be represented by a higher amplitude signal than the other information. Thus, by monitoring the information signal of a particular location, not only does the central station receive information as to a normal or ready condition, a burglary condition, but also information that the protected location or a sensing device in the protected location is not ready to detect the presence of a burglary. These possible signals are illustrated in FIG. 2 wherein levels 11 indicate the normal condition in a plurality of protected locations and level 12 indicates a burglary condition in a plurality of locations while levels 13 indicate an open condition in a plurality of locations.

While a specific type of information signal and the source of this signal has been described hereinabove with respect to protection facilities, it is to be clearly understood that this is merely an example of a possible information signal source and does not constitute a limitation to the system disclosed herein. It should be understood that the information signals to be multiplexed by the multiplex system of this invention could be any type of information signal from any source. Digital information signals can have two, three, or more code levels to indicate any desired condition at a remote location. More specifically, the system described herein would have utility in any telemetering system or the like utilizing digital information signals.

Turning now to the example of base frequency and other specifications relating to the transmitted signal, let us assume a base frequency of 4,000 cycles per second (c.p.s.) or 4 kc. (kilocycles per second) with 1024 time slots per frame. Thus, it would be possible to sample periodically 1024 information signals within a 250 microsecond period. This rate of sampling the information is so selected that a low bandwidth line, such as employed in telephone, direct current, or carrier transmission systems and the like, can be employed between the transmitter and receiver of the multiplex system of this invention. Utilizing the 4 kc. base frequency rate, 1024 different signals can be transmitted in a 2 kc. bandwidth using non-return-to-zero transmission. Thus, each information signal source will be sampled four times a second. This will give a one-fourth second delay in transmitting any information from the signal sources. This delay can be reduced by scanning faster and using a wider bandwidth line from the transmitter to the receiver. The above scanning rate will be used in describing the system disclosed herein but it is important to realize that any scanning rate could be employed and any transmission media likewise could be employed that can accommodate the wider bandwidth needed as the scanning rate increases.

Thus, source 1 includes oscillator 14 having a repetition of 4 kc. The sine wave output of oscillator 14 is coupled to shaper 15 to provide a base frequency pulse signal, a substantially square wave pulse signal repetitious at the base frequency of 4 kc. The output of shaper 15 is coupled to differentiator 16 to produce sharp triggering pulses for actuation of means 2 to provide the plurality of time sequential pulse trains. As illustrated in FIG. 1, means 2 includes counter and diode matrix 17 including ten flip-flop counters 18 connected in tandem so that the first flip-flop is triggered at 4 kc. with the first flip-flop operating at 2 kc., the second at 1 kc., and so forth, until the tenth flip-flop operates at 3.9 c.p.s. By appropriate connection of diode AND gates, 1024 separate outputs may be obtained from the chain of counters 18, each output being 250 microseconds wide occurring at a 3.9 c.p.s. rate. The illustration of distributor 17 in FIG. 1 is shown to have several stages of diode gate matrices chosen to minimize the number of diodes and provide flexibility in choice of the number of channels. The outputs of counters 18 are divided into two groups of five flip-flops with thirty-two outputs from each group. This is accomplished by providing primary diode matrix 19 and 20 coupled to the first five flip-flops of counter 18 and a secondary matrix 21 coupled to primary matrices 19 and 20. Matrix 19 is a 2 x 4 diode matrix and primary matrix 20 is a 3 x 8 diode matrix. Matrices 19 and 20 cooperate to provide twelve outputs which are coupled to secondary matrix 21 which is a 2 x 32 diode matrix providing thirty-two pulse train outputs. Primary diode matrix 22 and primary diode matrix 23, having the same matrix configuration as matrices 19 and 20, respectively, are coupled to the last five flip-flops of counter 18 with their outputs being coupled to secondary matrix 24 having the same configuration as matrix 21 to provide thirty-two pulse train outputs. The pulse train outputs of diode matrix 21 will have a repetition rate of 125 c.p.s. (4000/32 c.p.s.) while the pulse train outputs of matrix 24 will have a repetition rate of 3.9 c.p.s. (4000/1024 c.p.s.). By appropriately combining the two groups of thirty-two pulse train outputs from matrices 21 and 24, 1024 separate time positions or time channels can be obtained. If suitable plug-in construction is employed, the second group of five counters could be replaced by 2, 3, or 4 counters, giving 128, 256, or 512 channels instead of the 1024 channels.

Means 4 includes a plurality of channel sampling units consisting of three diode AND gates and an output coupling diode. The AND gate of channel No. 1 is shown schematically and includes a diode 25 coupled to information source 3 and diodes 26 and 27 coupled to the outputs of distributor 17. Diode 28 is the coupling diode and provides isolation between the channel AND gates. As illustrated the channel AND gates are grouped into thirty-two groups of thirty-two channels per group. Thus, to provide the desired sampling of the information signal from source 3 in channel No. 1 the first pulse train output of matrix 24 is coupled to diode 27 of channel No. 1 and to a similar diode in the other channel AND gates of the first group of thirty-two channel AND gates. The first pulse train output of matrix 21 is coupled to diode 26 of the channel No. 1 AND gate and the other pulse train outputs of matrix 21 are coupled to the other thirty-one AND gates of the first group of AND gates. With this arrangement the second to thirty-second pulse train outputs of matrix 24 are coupled to the appropriate group of thirty-two channel AND gates. Thus, the second pulse train output of matrix 24 is coupled to the second group of thirty-two channel AND gates and the thirty-second pulse train output of matrix 24 is coupled to the thirty-second group of thirty-two channel AND gates. Thus, with this distribution and cooperation of the groups of channel AND gates and the two groups of pulse train outputs from distributor 17, 1024 channels or time positions are established and the information signals from sources 3 will be sequentially sampled and time multiplexed. The output signals from the channel AND gates are coupled to amplifier 5.

As illustrated in the thirty-second group of thirty-two channel AND gates the last channel AND gate is a dual diode AND gate which when a pulse train input is present simultaneously on diodes 29 and 30 will cause the production of a framing signal having an amplitude level different than the amplitude levels of the code signal whether it is a two-level code signal or a three-level code signal. As an illustration of this framing signal, attention is directed to FIG. 2 wherein pulse 31 represents the framing signal for the multiplex system of this invention. Amplifier 5 is coupled by means of conductor 32 to the output of source 1 and by conductor 33 to the output of the framing signal channel. These two signals, the base signal and the framing signal, are combined with the multiplex signal in amplifier 5 and conveyed therewith over transmission line 7.

The information modulated multiplex signal and the framing signal, such as illustrated in FIG. 2, together with the base frequency signal are received in amplifier 8 from transmission line 7 and applied to the demultiplexing arrangement of the receiver. The means 9 to produce the plurality of pulse trains in the receiver is illustrated as including filter 34 to pass only the base frequency signal of the received signal to a shaper and differentiator 35 for production of a triggering pulse to activate the counter and diode matrix distributor 36. Distributor 36, substantially identical to distributor 17 of the transmitter, produces two groups of thirty-one pulse trains with the first group of pulse trains each having a repetition rate of 125 c.p.s. and the second group of pulse trains each having a repetition frequency of 3.9 c.p.s. The framing pulse is selected from the received multiplex signal by amplitude selector 37 and applied to the counters of distributor 36 to reset the chain of counters to the same phase once each frame in order to obtain the framing information and, therefore, synchronize distributor 36 with distributor 17 and, hence, assure the pulse trains of distributor 36 having the same time position as the pulse trains of distributor 17. The channel separators are arranged in groups of thirty-two channels composed of AND gates as illustrated schematically for the AND gate of channel 1. This AND gate includes diode 38 coupled to the output of amplifier 8 and diodes 39 and 40 coupled to the output of distributor 36 in a manner similar to that described in connection with the groups of sample gates in the transmitter of this system. Namely, and as illustrated, each pulse train output of the first plurality of pulse trains is coupled to a diode, such as diode 40, of all the channel separators of an associated group of channel separators and each of the pulse trains of the second group are all coupled to a diode, such as diode 39, of all the channel separators of each of the groups of channel separators. When appropriate ones of the pulse trains of the two plurality of pulse train outputs of distributor 36 are simultaneously present on diodes of the channel separation AND gates, such as diodes 39 and 40, the appropriate channel signal will be coupled to a utilization device 41 to utilize the digital information signal. In accordance with the example employed herein, the output of the channel separation AND gate would be applied to a hold circuit 42 to store the information coupled from the AND gate for activation of an alarm indicator 43 when the alarm condition is received in this channel. It should be recalled, however, that the utilization device of each of the channels would utilize the information to obtain an indication depending upon the utility of the system.

Figure 3:
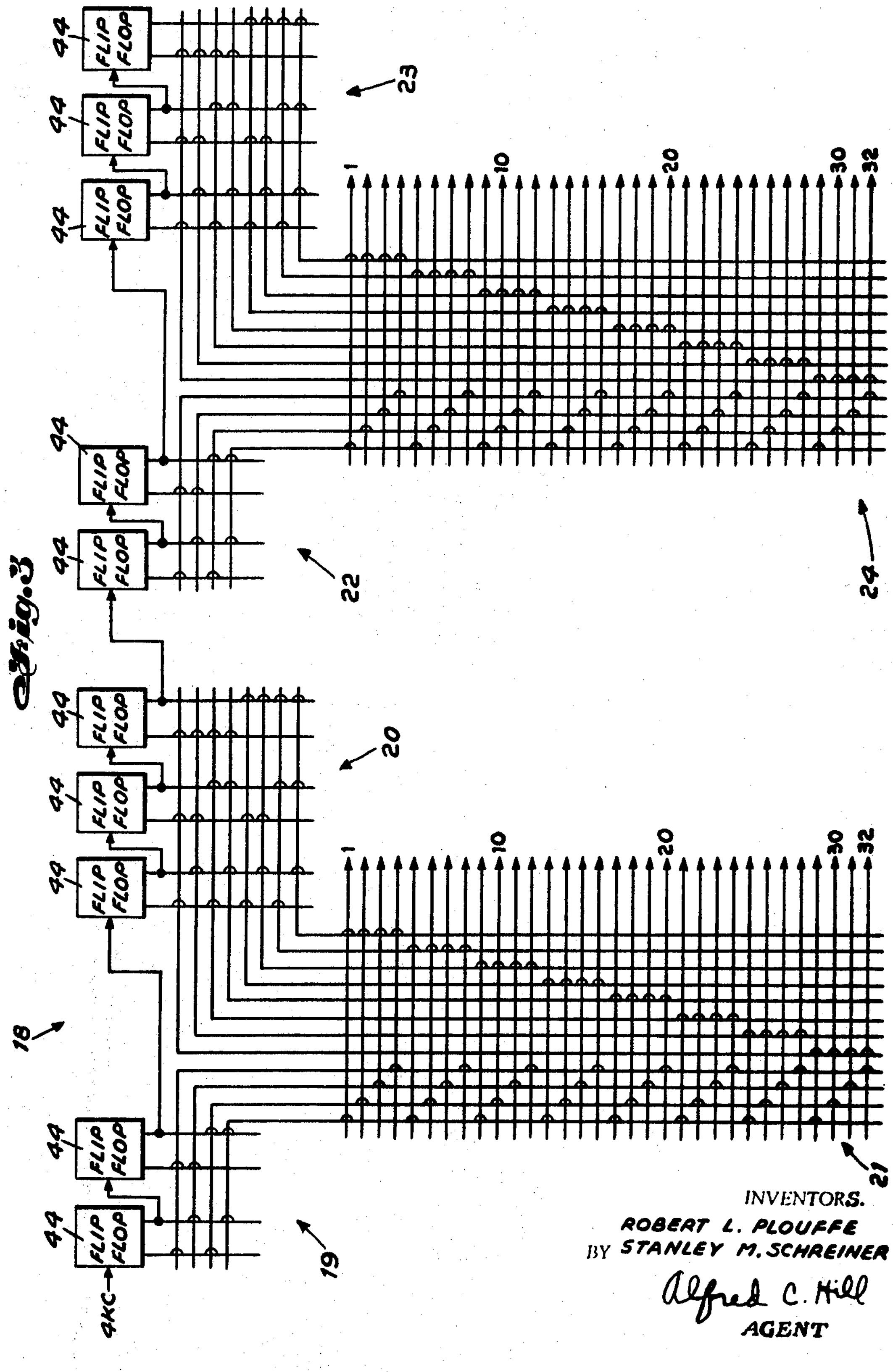
FIG. 3 is a schematic diagram partially in block form illustrating one form of the distributors employed in the transmitter and the receiver of the system illustrated in FIGS. 1 and 1A.

Referring to FIG. 3, the schematic diagram of one arrangement of the distributors 17 and 36 is illustrated in schematic form. The semicircles in FIG. 3 indicate symbolically diodes. Counter 18 is illustrated as including ten flip-flop circuits 44 connected in tandem to produce the desired count. The first two flip-flops 44 have their outputs connected in the predetermined manner illustrated to four output conductors by diodes to form primary matrix 19. The third, fourth, and fifth flip-flops 44 have their six outputs connected by diodes in the manner illustrated to eight output conductors to form primary matrix 20. The last five flip-flops are connected as illustrated to provide diode matrices 22 and 23. The resultant twelve outputs from the two primary matrices 19 and 20 are coupled to secondary matrix 21, as illustrated, to provide thirty-two pulse trains at the outputs thereof having a repetition rate of 125 c.p.s. As pointed out hereinabove, each of the pulse train outputs from matrix 21 is coupled to each of the groups of channel AND gates, either in the transmitter or the receiver. The secondary matrix 24 is coupled, as illustrated, to the twelve output lines of primary matrices 22 and 23 to provide thirty-two pulse trains on the output lines thereof. However, the repetition rate of each of these pulse trains will be equal to 3.9 c.p.s. and spaced from one another by thirty-two time positions. Thus, each of the pulse train outputs from matrix 24, as described hereinabove, is coupled to a different one of the groups of the channel AND gates. Thus, utilizing this arrangement it is possible to produce the required 1024 channel positions. The chart hereinbelow graphically demonstrates the channel positions and the numbered outputs of secondary matrices 21 and 24 to produce 1024 time or channel positions:

CHART

| Channel positions | Secondary Matrix 21 | Secondary Matrix 24 |
|---|---|---|
| 1-32 | 1-32 | 1 |
| 33-64 | 1-32 | 2 |
| 65-96 | 1-32 | 3 |
| 97-128 | 1-32 | 4 |
| 129-160 | 1-32 | 5 |
| 161-192 | 1-32 | 6 |
| 193-224 | 1-32 | 7 |
| 225-256 | 1-32 | 8 |
| 257-288 | 1-32 | 9 |
| 289-320 | 1-32 | 10 |
| 321-352 | 1-32 | 11 |
| 353-384 | 1-32 | 12 |
| 385-416 | 1-32 | 13 |
| 417-448 | 1-32 | 14 |
| 449-480 | 1-32 | 15 |
| 481-512 | 1-32 | 16 |
| 513-544 | 1-32 | 17 |
| 545-576 | 1-32 | 18 |
| 577-608 | 1-32 | 19 |
| 609-640 | 1-32 | 20 |
| 641-672 | 1-32 | 21 |
| 673-704 | 1-32 | 22 |
| 705-736 | 1-32 | 23 |
| 737-768 | 1-32 | 24 |
| 769-800 | 1-32 | 25 |
| 801-832 | 1-32 | 26 |
| 833-864 | 1-32 | 27 |
| 865-896 | 1-32 | 28 |
| 897-928 | 1-32 | 29 |
| 929-960 | 1-32 | 30 |
| 961-992 | 1-32 | 31 |
| 993-1,024 | 1-32 | 32 |

While we have described above the principles of our invention in connection with specific apparatus, it is clearly understood that this description is made only by way of example and not as a limitation to the scope of our invention as set forth in the objects thereof and in the accompanying claims.

We claim:

1. A time division multiplex system comprising:
a source of base frequency signal having a given repetition frequency;
first means coupled to said source of base signal to produce a first plurality of time sequential pulse trains;
a plurality of sources of information signals;
second means coupled to said plurality of sources and said first means responsive to said information signals and said first pulse trains to produce an information modulated time division multiplex signal;
third means coupled in common to said second means and said source of base signal to convey said multiplex signal and said base signal;
fourth means coupled to said third means to receive said conveyed signals;
fifth means coupled so said fourth means responsive to said received base signal to provide a second plurality of time sequential pulse trains; and
sixth means coupled to said fourth means and said fifth means responsive to said second pulse trains and said received multiplex signal to sequentially recover said information signals.

2. A system according to claim 1, further including
seventh means coupled to said first means responsive to at least one of said first pulse trains to produce a framing signal;
said third means coupled to said seventh means to convey said framing signal together with said multiplex signal and said base signal; and
eighth means coupled between said fourth means and said fifth means responsive to said received framing signal to control said fifth means to frame said second pulse trains with respect to said first pulse trains.

3. A system according to claim 2, wherein
said plurality of sources of information signals are a plurality of sources of digital information signals, each digit of said digital signals having one of three possible amplitudes; and
said seventh means produces said framing signal having an amplitude different than said three possible amplitudes.

4. A system according to claim 1, wherein
said first means includes
seventh means to produce a first plurality of timing signals each having a repetition frequency equal to a first given fraction of said given repetition frequency, and
eighth means to produce a second plurality of timing signals each having a repetition frequency equal to a second given fraction of said given repetition frequency different than said first given fraction; and
said second means combines in a predetermined manner said first plurality of timing signals and said second plurality of timing signals to produce said first pulse trains.

5. A system according to claim 4, further including
ninth means coupled to one of said first plurality of timing signals and one of said second plurality of timing signals to produce a framing signal;
said third means coupled to said ninth means to convey said framing signal together with said multiplex signal and said base signal; and
tenth means coupled between said fourth means and said fifth means responsive to said received framing signal to control said fifth means to frame said second pulse trains with respect to said first pulse trains.

6. A system according to claim 4, wherein
said second means includes
a plurality of groups of modulators,
ninth means to couple said first plurality of timing signals from said seventh means to each of said groups of modulators, and
tenth means to couple each timing signal of said second plurality of timing signals from said eighth means to a different one of said groups of modulators,
said ninth and tenth means cooperating to produce said first pulse trains.

7. A system according to claim 6, wherein
one of said plurality of groups of modulators includes
a framing signal generator coupled to said seventh means and said eighth means responsive to one of said first plurality of timing signals and one of said second plurality of timing signals to produce a framing signal;
said third means coupled to said one of said plurality of groups of modulators to convey said framing signal together with said multiplex signal and said base signal; and
eleventh means coupled between said fourth means and said fifth means responsive to said received framing signal to control said fifth means to frame said second pulse trains with respect to said first pulse trains.

8. A system according to claim 1, wherein
said fifth means includes
seventh means to produce a first plurality of timing signals each having a repetition frequency equal to a first given fraction of said given repetition frequency, and
eighth means to produce a second plurality of timing signals each having a repetition frequency equal to a second given fraction of said given repetition frequency different than said first given fraction; and
said sixth means combines in a predetermined manner said first plurality of timing signals and said second plurality of timing signals to produce said second pulse trains.

9. A system according to claim 8, wherein
said sixth means includes
a plurality of groups of channel separating means,
ninth means to couple said first plurality of timing signals from said seventh means to each of said groups of channel separating means, and tenth means to couple each timing signal of said second plurality to timing signal from said eighth means to a different one of said groups of channel separating means, said ninth and tenth means cooperating to produce said second pulse trains.

10. A system according to claim 1, wherein said first means includes seventh means to produce a first plurality of timing signals each having a repetition frequency equal to a first given fraction of said given repetition frequency, and eighth means to produce a second plurality of timing signals each having a repetition frequency equal to a second given fraction of said given repetition frequency different than said first given fraction;

said second means includes a plurality of groups of modulators, ninth means to couple said first plurality of timing signals from said seventh means to each of said groups of modulators, tenth means to couple each timing signal of said second plurality of timing signals from said eighth means to a different one of said groups of modulators, and a framing signal generator coupled to said seventh means and said eighth means responsive to one of said first plurality of timing signals and one of said second plurality of timing signals to produce a framing signal;

said third means is coupled to said generator to convey said framing signal together with said multiplex signal and said base signal;

said fifth means includes eleventh means to produce a third plurality of timing signals each having a repetition frequency equal to said first fraction, and twelfth means to produce a fourth plurality of timing signals each having a repetition frequency equal to said second fraction;

said sixth means includes a plurality of groups of channel separating means, thirteenth means to couple said third plurality of timing signals from said eleventh means to each of said groups of channel separating means, and fourteenth means to couple each timing signal from said twelfth means to a different one of said groups of channel separating means; and fifteenth means coupled between said fourth means and said fifth means responsive to said received framing signal to control said fifth means to frame said third and fourth plurality of timing signals with respect to said first and second plurality of timing signals.

11. A time division multiplex transmitter comprising:

a source of base frequency signal;

first means coupled to said source of base signal to produce a plurality of time sequential pulse trains;

a plurality of sources of information signals;

second means coupled to said plurality of sources and said first means responsive to said information signals and said pulse trains to produce an information modulated time division multiplex signal; and third means coupled in common to said second means and said source of base signal to transmit said multiplex signal and said base signal.

12. A transmitter according to claim 11, further including fourth means coupled to said first means responsive to at least one of said pulse trains to produce a framing signal;

said third means coupled to said fourth means to transmit said framing signal together with said multiplex signal and said base signal.

13. A time division multiplex receiver comprising:

a source of received information modulated time division multiplex signal and received transmitter base frequency signal;

first means coupled to said source responsive to said base signal to produce a plurality of time sequential pulse trains; and second means coupled to said source and said first means responsive to said multiplex signal and said pulse trains to sequentially recover said information.

14. A receiver according to claim 13, wherein said source further provides a received framing signal; and said receiver further includes a third means coupled between said source and said first means responsive to said framing signal to control said first means to frame said pulse trains with respect to the channel positions of said multiplex signal.

References Cited

UNITED STATES PATENTS

| | | | |
|---|---|---|---|
| 2,945,094 | 7/1960 | Metzger | 179—15 |
| 3,073,902 | 1/1963 | McAdams | 178—69.5 XR |
| 3,238,299 | 3/1966 | Lender | 325—38 |
| 3,310,742 | 3/1967 | Adams | 343—204 XR |
| 3,355,553 | 11/1967 | Miyagi | 179—15 |

RICHARD MURRAY, Primary Examiner

C. R. VONHELLENS, Assistant Examiner

U.S. Cl. X.R.

178—50